(12) United States Patent
Gieseke et al.

(10) Patent No.: US 6,519,554 B1
(45) Date of Patent: Feb. 11, 2003

(54) COMPUTER IMPLEMENTED SYSTEM AND METHOD FOR EVALUATING GAS GENERATOR LAUNCHERS

(75) Inventors: Thomas J. Gieseke, Newport, RI (US); Michael W. Williams, Middletown, RI (US); Jeffrey L. Cipolla, Newport, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/313,314

(22) Filed: May 17, 1999

(51) Int. Cl.$^7$ ................................................. G06F 7/48
(52) U.S. Cl. ............................................. 703/6; 703/2
(58) Field of Search ..................... 703/2, 6; 89/1.81, 89/1.807, 1.809, 1.11; 114/238, 20.1, 20.2; 244/3.21, 3.22; 42/1.14, 1.41; 235/401; 102/456; 92/90; 701/3; 417/437

(56) References Cited

U.S. PATENT DOCUMENTS

| | | | | |
|---|---|---|---|---|
| 3,137,203 A | * | 6/1964 | Brown ....................... | 89/1.81 |
| 3,279,319 A | * | 10/1966 | Semonian et al. ............ | 89/1.81 |
| 3,516,380 A | * | 6/1970 | Johnston ..................... | 114/238 |
| 3,692,258 A | * | 9/1972 | Parilla ....................... | 244/3.21 |
| 3,806,064 A | * | 4/1974 | Parilla ....................... | 244/3.22 |
| 3,807,274 A | * | 4/1974 | Cohen ........................ | 89/1.81 |
| 4,077,147 A | * | 3/1978 | Donnard et al. ............. | 42/1.14 |
| 4,246,472 A | * | 1/1981 | Sun et al. ................... | 235/401 |
| 4,357,888 A | * | 11/1982 | Phillips et al. .............. | 114/20.1 |
| 4,372,239 A | * | 2/1983 | Hagelberg et al. ......... | 114/20.2 |
| 4,584,925 A | * | 4/1986 | Culotta et al. ............. | 89/1.807 |
| 4,742,775 A | * | 5/1988 | Harris ........................ | 102/456 |
| 4,821,441 A | * | 4/1989 | Castro, Jr. et al. ........... | 42/1.41 |
| 5,230,276 A | * | 7/1993 | Collett .......................... | 92/90 |
| 5,425,301 A | * | 6/1995 | Kriebel ....................... | 89/1.809 |
| 5,639,982 A | * | 6/1997 | Cipolla ....................... | 89/1.11 |
| 5,721,680 A | * | 2/1998 | Van Cleve et al. ............. | 701/3 |
| 5,918,307 A | * | 6/1999 | Cipolla ....................... | 89/1.81 |
| 6,146,114 A | * | 11/2000 | Nardacci et al. ............ | 417/437 |

OTHER PUBLICATIONS

Theunissen et al., D.J. Effects of Environment and Aging Upon Missile Reliability, Reliability and Maintainability Symposium, 1998, pp. 314–320.*

Chapuis et al., Determination and Influence of the Main Parameters for the Launch and Recovery of an Unmanned Underwater Vehicle form a Submarine, Proceedings of the 1996 Symposium on Autonomous Underwater Vehicle Technology, AUV '96, pp. 276–282.*

\* cited by examiner

*Primary Examiner*—Russell Frejd
(74) *Attorney, Agent, or Firm*—Michael J. McGowan; James M. Kasischke; Michael F. Oglo

(57) ABSTRACT

A computer-implemented system and method for evaluating gas generator launchers is provided. The method includes fixing the system geometry and establishing initial conditions of the launcher to be evaluated. The initial conditions include a mass, composition and geometry of the fuel included in the gas generant, geometries of the system components, initial pressures and temperatures and the mass and geometry of the device to be launched. A gas generator internal ballistics burn rate is modeled and an amount of mass and energy added to the combustion chamber as the fuel is consumed is calculated. Then, using conservation of mass and energy principles, an energy flux rate is modeled, beginning with the fuel and ending with the work performed on the device in order to propel it from the launcher. The modeling method is performed using a computer-based gas generator launcher simulation system, which includes a means for inputting gas generator launcher geometries and initial conditions, a launcher simulator program in computer memory for resolving gas and device dynamic equations to integrate a solution from said initial conditions to the end of a launch cycle, and a display means for displaying the integrated solution.

10 Claims, 6 Drawing Sheets

COMPUTER IMPLEMENTED SYSTEM AND METHOD FOR EVALUATING GAS GENERATOR LAUNCHERS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates to a system and method for modeling gas generator launchers, and more particularly to a computer-implemented system and method of modeling a device launched by way of a boosted argon hybrid (BAH) energy source.

(2) Description of the Prior Art

When properly designed and implemented, a BAH energy source can be utilized as a device launcher. One such application of a device launcher would be from a submerged vehicle, such as a submarine, which may have a need to launch devices into the surrounding environment. However, since the surrounding environment is at a pressure higher than the interior pressure of a submarine, an elevated pressurized launch system is needed.

One such device launcher is a boosted argon hybrid (BAH) powered gas generator launcher. FIG. 1 shows a typical BAH system with two BAH units 13 and a ram plate 30. During the launch process fuel 22 converts into a hot pressurized gas in the combustion chamber 16, and then flows into a gas expansion tank 18. The pressurized argon then flows through an external orifice 26 into a plenum chamber 24. The gasses expand in the plenum chamber 24, and accelerate the ram plate 30 (if included) and the device being launched 28. Gasses may flow around any gap 25 about the ram plate and device.

One approach to evaluating gas generator launcher designs is to fabricate and actuate test gas generator launchers and to physically measure their performance. As can be appreciated, such fabrication and testing requires construction of the test launcher, fabrication of gas generant fuel and measurement of launcher perimeters, including pressures, temperatures, velocities and acceleration during the actual firing of such a launcher.

This type of testing is labor intensive, time consuming and costly. Physical testing is also expensive because chemical compounds, containers and measuring equipment employed are subject to wear or destruction during each test. In order to test launchers having different dimensions, separate test apparatus must be constructed. Moreover, it would be difficult to vary one or more launcher parameters in order to satisfy the design goals should a specific launcher design fail to satisfy performance goals. Accordingly, parameters that can be modified are limited to fuel composition, geometry and quantity.

Thus, it would be an advancement in the art to provide a system and method of modeling a device launcher which reduces or eliminates the need for fabrication and testing. It is also an advancement to provide such a system and method in a computerized implementation which can be used to predict gas generator performance characteristics without destructive testing of gas generant compounds.

SUMMARY OF THE INVENTION

The present invention provides a computer-implemented system and method for evaluating gas generator launchers, which include at least one gas generator having a gas generant fuel housed within a combustion chamber, a tank containing a compressed gas in fluid communication with the combustion chamber through an internal orifice. The internal orifice is sealed with a rupture disk prior to gas generant ignition. The tank is also in fluid communication with a plenum chamber through an external orifice. The external orifice is also sealed with a second rupture disk until the pressure in the compressed gas tank exceeds the design characteristics of the rupture disk. Within the plenum chamber is a device to be launched and, in certain embodiments, a ram plate positioned intermediate the device and the external orifice. The ram plate reduces losses resulting from the blow-by of gasses around the device being launched.

The method includes fixing the system geometry and establishing initial conditions of the launcher to be evaluated. The initial conditions include a mass, composition and geometry of the fuel included in the gas generant, geometries of the tank internal and external orifices and plenum chamber, initial pressures within the pressurized gas tank and plenum chamber, and the mass and geometry of the device to be launched. In addition, if included, the mass of the ram plate must be fixed. Otherwise, the geometry of any gap existing between the device to be launched and the walls of the plenum chamber must be factored into the equation.

Next, a gas generator internal ballistics burn rate is modeled, and an amount of mass and energy added to the combustion chamber as the fuel is consumed is calculated. Then, the rate of mass flux out of the combustion chamber and into the gas tank is modeled utilizing internal orifice geometry, tank and combustion chamber temperatures, tank gas mass, and a ratio of combustion chamber and tank pressure.

A rate of energy flux out of the combustion chamber and into the tank is also modeled using the rate of mass flux out of the combustion chamber and into the tank, the combustion chamber temperature and the specific heat of the combustion chamber gas.

The rate of mass flux and energy flux out of the tank and into the plenum are also modeled utilizing external orifice geometry, tank and plenum temperatures, plenum gas mass and the specific heat of the tank gas. The launch of the vehicle itself is modeled using the mass and energy input into the plenum and subtracting the work imparted upon the vehicle in order to move the vehicle. Finally, losses resulting from blow-by through the gap between the vehicle and the plenum walls, if any, is included in the model.

BRIEF DESCRIPTION OF THE DRAWINGS

These and other features and advantages of the present invention will become more fully apparent through the following description and appended claims taken in conjunction with the accompanying drawings wherein:

DESCRIPTION OF THE PREFERRED EMBODIMENT

Figure 1:
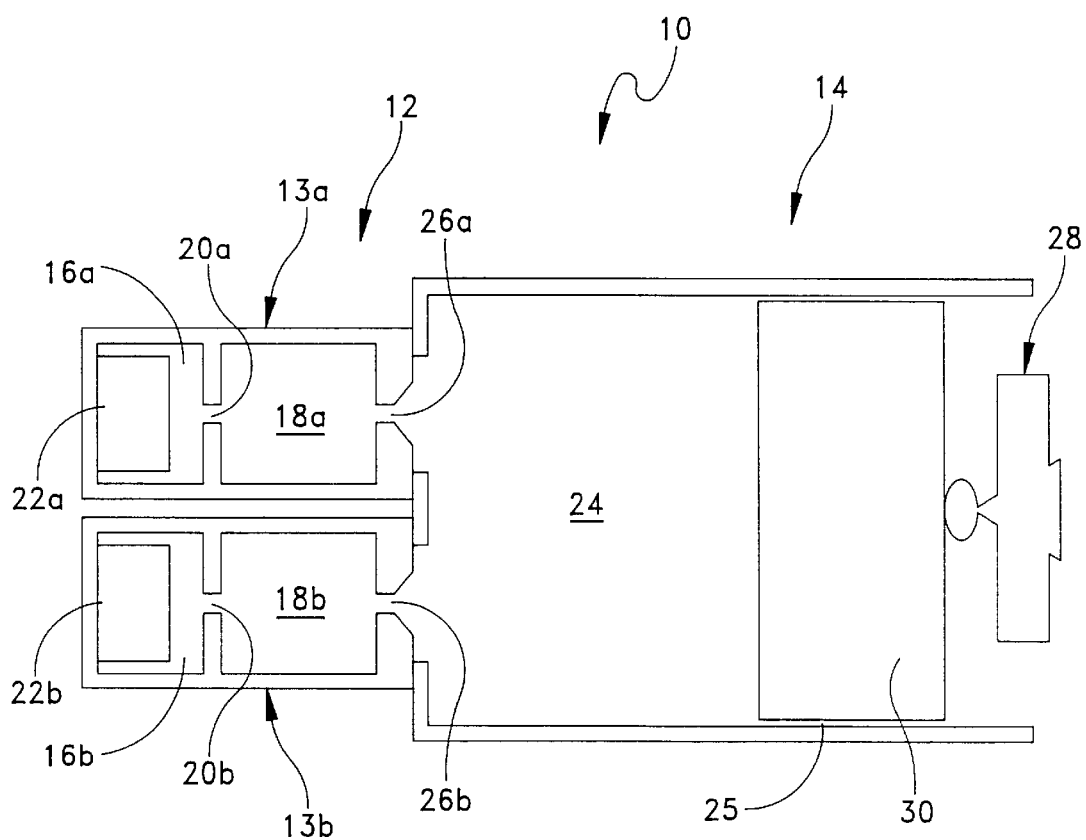
FIG. 1 is a schematic of a prior art BAH launcher system.

A boosted argon hybrid (BAH) launcher system can be modeled as the combination of fixed volume chambers and an expanding piston chamber connected by sharp edged orifices. FIG. 1, shows a typical BAH launcher system 10. The BAH launcher system 10 includes an energy source section 12 and a device launch section 14. The energy source section 12 may be removable from the device launch section 14 such that a launcher of the configuration disclosed can be utilized any number of times, provided new energy source sections are attached thereto. In the embodiment shown in FIG. 1, two BAH energy sources 13a and 13b are attached to a single device launch section 14. However, this is not a limitation of the disclosed modeling method, which is flexible enough to model a BAH device launcher configured with any number of BAH energy sources.

Each energy source 13, in the preferred embodiment, comprises two chambers, including a combustion chamber 16 and an expansion tank 18. The combustion chamber 16 is in fluid communication with expansion tank 18 via an internal orifice 20. Included in the combustion chamber is a quantity of gas generant fuel 22, which will be more fully described below.

The device launch section includes a plenum chamber 24, having interior walls, which is in fluid communication with each expansion tank 18 via an external orifice 26. Also included in the launch section is a device to be launched 28 and an optional ram plate 30, which minimizes losses around the device 28 and between the gap 25 intermediate the device 28 and the walls of the plenum chamber during a launch cycle.

In operation, the BAH launcher system 10 has an initial state prior to ignition. In the initial state, each of the combustion chambers 16, expansion tanks 18, and plenum chamber 24 have an initial temperature, initial pressure, particular thermal conductivity and a total heat capacity. The internal and external orifices 20, 26, are each capped with a rupture disk, which isolates the three chambers from each other in the initial state. Furthermore, in the initial state, expansion tank 18 contains a volume of compressed argon gas. For the purposes of this invention, this gas can be any known relatively inert gas. The combustion chamber 16 has an initial quantity of gas generant 22. The plenum chamber 24 houses a mass to be launched, which includes the mass of vehicle or device 28 and ram plate 30, if included in the system.

The gas generant fuel 22 initially has a given total mass whose combustion product mass fractions are known. The fuel also has a known heat capacity, a thermal conductivity, ignition temperature and a flame temperature.

The launch process which is modeled by the present invention involves the conversion of the fuel 22 into hot pressurized gas in the combustion chamber 16, the flow of this gas through internal orifice 20 into the tank 18 where compressed argon is contained, the flow of the pressurized argon and gas generated by the fuel through the external orifice 26 into the plenum chamber 24, the expansion of the gases in the plenum chamber, the flow of gas through the gap and the device 28 or ram plate 30, and the acceleration of the ram plate 30 and device 28. This basic geometry can be modified to model more complex launcher configurations, without changing the basic physics of the problem.

Figure 2:
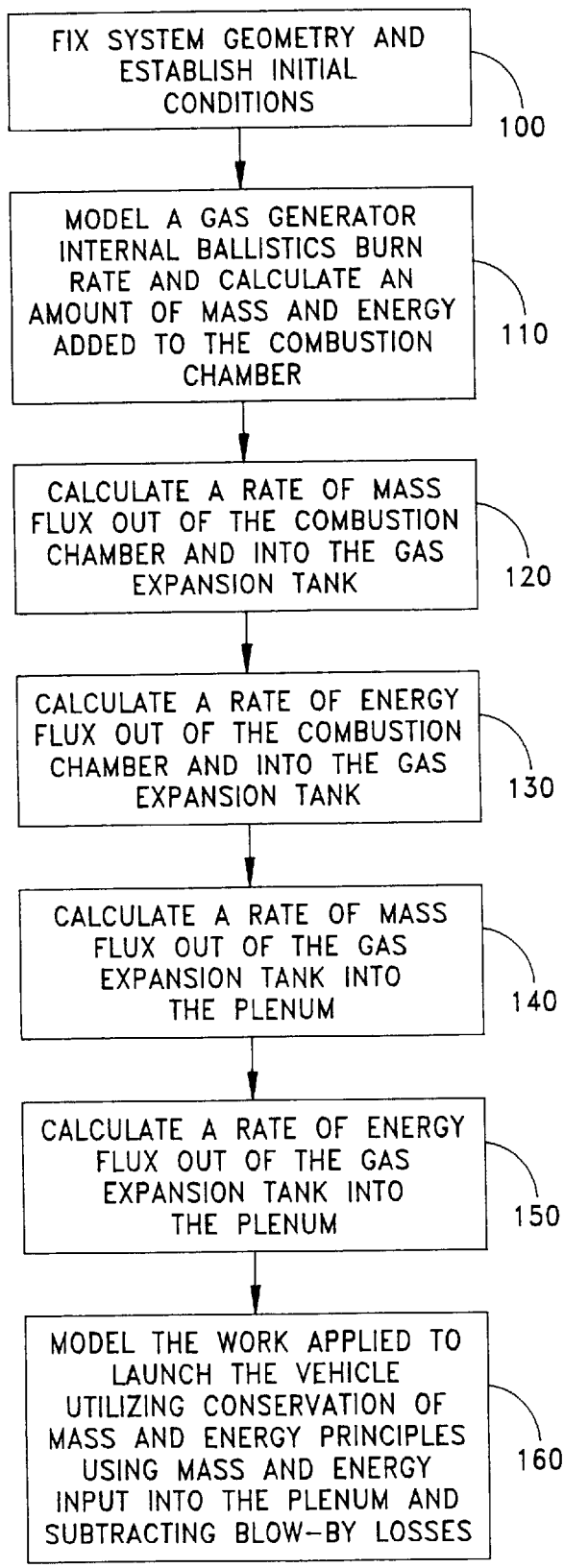
FIG. 2 is a flow chart showing the steps of the method of evaluating a gas generator launcher system in accordance with the teachings of the present invention.

The method of evaluating a gas generator launcher system according to the present invention is shown in FIG. 2. In the first step of the method, step 100, the system geometry and initial conditions are ascertained and fixed. The initial conditions include: a mass, composition and geometry of the fuel included in the gas generant; the geometries of the tank, internal and external orifices and plenum chamber; an initial pressure of the gas within the gas expansion tank; and a mass and geometry of the device to be launched including any gap existing between the device and the walls of the launcher plenum chamber.

The second step 110, models a gas generator internal ballistics burn rate and calculates an amount of mass and energy added to the combustion chamber 16 as the fuel is consumed. In step 120 a rate of mass flux out of the combustion chamber 16 is modeled. This model takes into account the internal orifice 20 geometry, gas expansion tank and combustion chamber temperatures, tank gas mass, and a ratio of combustion chamber and tank pressures.

In step 130, a rate of energy flux out of the combustion chamber 16 and into the gas expansion tank 18 is calculated utilizing the rate of mass flux out of the combustion chamber and into the tank, the combustion chamber temperature and the specific heat of the combustion chamber gas.

Next, in step 140, a rate of mass flux out of the gas expansion tank 18 and into the plenum chamber 24 is calculated. This calculation takes into account the external orifice geometry, which separates the gas expansion tank from the plenum, expansion tank and plenum temperatures, plenum gas mass and a ratio of expansion tank and plenum pressures.

In step 150, a rate of energy flux out of the expansion tank 18 and into the plenum chamber 24 is calculated. This calculation utilizes the rate of mass flux out of the tank and into the plenum as well as the tank temperature and the specific heat of the expansion tank gas.

Finally, in step 160, the launch of a vehicle 28 within the plenum chamber 24 is modeled utilizing conservation of mass and energy principles, taking into account the mass and energy input into the plenum and subtracting the losses resulting from blow-by through the gap 25 between the vehicle 28 and the plenum walls.

To correctly model the process outlined above, a set of governing equations must be established. To simplify the problem the following assumptions will be made: all gas in the system is argon and can be modeled as an ideal gas; the fuel remains at ambient temperature until it is burned; flow through the orifices is adiabatic and compressible; and flow through the gap can be approximated using Fanno flow equations.

The notation used to describe these processes is as follows:

The set of equations to be solved are derived using
1. The Gas Generator Internal Ballistics model for the fuel burn rate;
2. Conservation of mass for each of the system volumes;
3. Conservation of energy for each of the system volumes;
4. Compressible flow equations for the flow through orifices and gaps; and
5. Newtonian model for the device motion.

Note that the notation used to describe these processes is as follows:

All physical quantities related to the combustion chamber will be denoted with the subscript c; all physical quantities related to the tank chamber will be denoted with the subscript 1; all physical quantities related to the plenum chamber will be denoted with the subscript 2; all mass quantities are expressed using m; all pressures are expressed using P; all temperatures are expressed using T; and other variables will be defined as needed.

Figure 3:
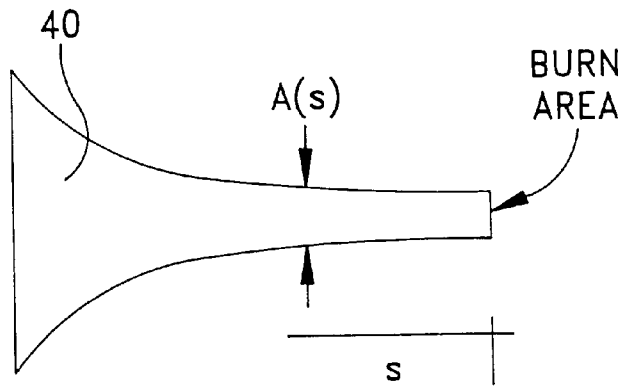
FIG. 3 is a conceptual model of a fuel cell burn.

The fuel burn rate is a function of the gas generant fuel slug design and the combustion chamber conditions. As the gas generant fuel burns, the exposed area of the fuel changes. The fuel cell can be thought of as a bar 40 of varying thickness which is burnt from one end to the other. The distance the flame has progressed along the bar length is denoted "s" and the area variation along the bar is expressed as A(s). This conceptual model is illustrated in FIG. 3.

Following the Gas Generator Internal Ballistics burn rate model, the rate at which the flame proceeds along the bar is a function of the combustion chamber pressure $P_c$, i.e.:

$$\frac{ds}{dt} = \beta P_c^\alpha \quad (1)$$

where $\beta$ is the burn rate coefficient and $\alpha$ is a burn rate exponent that is a constant for the fuel. As the fuel burns, mass is added to the system ($\dot{m}_f$) at a rate equal to the consumption rate of the fuel multiplied by the fraction of the combustion products that are gaseous, G. The energy released by the fuel ($\dot{E}_f$) is assumed to be proportional to the mass consumed.

$$\dot{m}_f = \left(\frac{ds}{dt} A(s) \rho_f\right) G \quad (2)$$

$$\dot{E}_f = C_p T \frac{ds}{dt} A(s) \rho_f \quad (3)$$

where $C_p$ is the specific heat of the combustion gasses and is the combustion chamber temperature and $\rho_f$ is the density of the fuel. The function A(s) is assumed to be a linear function of s, $A(s) = A_0 + A_1 s$, for most fuel cell designs.

The rate of mass and energy flux out of the combustion chamber is related to the flow rate of gas through the internal orifice. If the ratio of the tank pressure to the combustion chamber pressure is less than the critical pressure ratio, $Pr_{crit}$, as defined by $$Pr_{crit} = \left[\frac{2}{\gamma+1}\right]^{\gamma/(\gamma-1)} \quad (4)$$

then the flow through the orifice will be choked. $\gamma$ is the ratio of specific heats. In this case the velocity of the gas through the orifice will be at Mach 1. The conditions at the orifice throat (for both choked and subsonic flow) are determined using the relations, $$T_t = \frac{T_{upstream}}{\left(1 + \frac{(\gamma-1)M_t^2}{2}\right)} \quad (5)$$

$$P_t = P_{upstream} \left[\frac{1.0}{1 + \frac{(\gamma-1)}{2}M_t^2}\right]^{\gamma/\gamma-1} \quad (6)$$

$$\rho_t = \frac{P_t}{RT_t} \quad (7)$$

$$C_t = \sqrt{\gamma R T_t} \quad (8)$$

$$C_t = \sqrt{\gamma R T_t} \quad (8)$$

where
 $M_t$ is the Mach number, and
 R is the gas constant

The mass flux out of the combustion chamber can then be expressed as $$\dot{m}_c = A_c \rho_t c_t \quad (9)$$

where $A_c$ is the area of the combustion chamber

If the pressure ratio is greater than the critical ratio (but less than 1.0), the flow is subsonic. Equations 5 through 9 above hold under these conditions, except the Mach number, $M_t$, must be determined using, $$M_t = \left\{\left[\left(\frac{P_{upstream}}{P_{upstream}}\right)^{(\gamma-1)/\gamma} - 1\right]\frac{2}{\gamma-1}\right\}^{1/2} \quad (10)$$

If the downstream pressure is greater than the upstream pressure, the flow will be reversed and equations 5 through 10 must be adjusted accordingly.

The energy flux out of the combustion chamber, $\dot{E}_c$, can be determined using the mass flow rate, the combustion chamber temperature, and the specific heat of the combustion chamber gas, i.e., $$\dot{E}_c = \dot{m}_c T_c C_p \quad (11)$$

The mass and energy flux into and out of the tank volume can be determined using equations 5 through 10, except instead of considering the combustion chamber and tank pressures and temperatures, the tank and plenum states should be used.

The plenum chamber has a mass and energy input from the BAH expansion tank, and it loses mass and energy via work done on the ram plate and device and blow-by through the gap around the ram plate and device. For some configurations, the ram plate gap is very small and the blow-by can be neglected. However in other launcher configurations, there is no ram plate, and there is substantial blow-by around the device. In these configurations the blow-by cannot be neglected. Fanno flow equations are used to compute the mass flow rate through the gap ($\dot{m}_{bb}$).

Energy lost from gas which escapes around a ram plate, or the device itself in the case where there is no ram plate, is modeled as Fanno flow to account for viscous effects of gas flowing down an annulus. The following describes the case where there is no ram plate and flow passes around the device. The annular area between the device and the tube wall is modeled as an equivalent area nozzle with a length equal to the length of the straight portion of the device. The length of the tapered section of the device, which is relatively short with respect to the overall length of the device, was neglected. The system equations are derived by using the continuity equation at the nozzle throat and the isentropic relations to determine the mass flow rate. The Mach number at the exit of the nozzle is determined to be:

$$(M_2)^2 = \left\{ \left( \frac{1}{\gamma - 1} \right)^2 + \frac{2}{\gamma - 1} \frac{M_1^2}{\left( \frac{P_{down}}{P_{up}} \right)^2} \left[ 1 + \frac{\gamma - 1}{2} M_1^2 \right]^{-\left( \frac{\gamma+1}{\gamma-1} \right)} \right\}^{\frac{1}{2}} - \frac{1}{\gamma - 1} \quad (12)$$

Where:

$(M_2)^2$ is the exit Mach number squared $(M_1)^2$ is the entrance Mach number squared $\gamma$ is the specific heat ratio of the gas, and $\left( \frac{P_{down}}{P_{up}} \right)$ is the ratio of the downstream pressure to the upstream pressure.

Note the use of an upstream and downstream pressure vice using ambient and tube pressure. A distinction is made to allow for the back flow that occurs towards the end of the transient as the plenum pressure drops below ambient, thus reversing the direction of the blow-by flow.

Using the Fanno Flow equations, the Mach number at the entrance of the nozzle was determined to be:

$$M_1^2 = \left\{ \frac{\gamma 4 f l}{D} + \frac{1}{M_2^2} - \frac{\gamma + 1}{2} \ln \left[ \frac{M_1^2}{M_2^2} \frac{2 + (\gamma - 1) M_2^2}{2 + (\gamma - 1) M_1^2} \right] \right\}^{-1} \quad (13)$$

Where:

f is the friction factor;

l is the frictional length of the device being launched; and

D is the effective diameter and is equal to 4 (wetted area/perimeter).

This friction factor is a function of Reynolds number and relative roughness of the walls of the nozzle. Over the range of values expected for flow through the blow-by area between the device and the tube, from Mach number 0.1 to 1, a friction coefficient of between 0.02 and 0.038 is estimated.

To solve for the entrance mach number needed in the final mass flow rate calculation, numerical methods were used with the two equations above to iterate to a solution. With the entrance Mach number known, the blow-by mass flow rate can be determined from:

$$\dot{m}_{bb} = \sqrt{\gamma \rho_{up} P_{up}} \, A M_1 \left[ 1 + \frac{\gamma - 1}{2} M_1^2 \right]^{-\frac{1}{2} \left( \frac{\gamma+1}{\gamma-1} \right)} \quad (14)$$

Where:

$\dot{m}_{bb}$ is the mass flow rate;

$\rho_{up}$ is the upstream gas density; and

A is the area of the nozzle or in this case the area of the annulus.

The work done by the gas on the ram plate (or device) is given by:

$$\dot{W} = P_2 A_d \dot{x}_2. \quad (15)$$

where $A_d$ is the area of the device or ram plate

The system dynamics equations can be developed using the mass and energy flux terms developed above. For ease of interpretation, the conservation of energy equations are expressed in terms of the temperature. The internal energy of a volume of gas is given as $E = mTC_v$. The time derivative of this equation is correctly written as $$\frac{dE}{dt} = C_v \left( m \frac{dT}{dt} + T \frac{dm}{dt} \right) = \dot{E}_{in} \dot{E}_{out} - \dot{W} - \dot{Q} \quad (16)$$

A heat transfer term $\dot{Q}$ has been included in this expression approximated as $HA(T - T_\infty)$, which includes a heat transfer coefficient H, a representative area A (approximated as the volume to the 2/3rd power), and the temperature difference between the gas and ambient conditions. Although this is a simplification of the heat transfer process, it is a valid approximation of the gross energy loss in the system.

Thus, the mass and energy flux terms for the three chambers in the BAH system are:

Combustion Chamber $$\frac{dm_c}{dt} = \dot{m}_f - \dot{m}_c \quad (17)$$

$$\frac{dT_c}{dt} = \frac{(C_p T^* \dot{m}_f - C_p T_c \dot{m}_c - (HV_c^{2/3}) T)_c}{m_c C_v} - (\dot{m}_f - \dot{m}_c) \left( \frac{T_c}{m_c} \right) \quad (18)$$

Tank Expansion $$\frac{dm_t}{dt} = \dot{m}_c - \dot{m}_t \quad (19)$$

$$\frac{dT_t}{dt} = \frac{(C_p T_c) \dot{m}_c - C_p T_t \dot{m}_t - (HV_t^{2/3}) T_t}{m_t C_v} - (\dot{m}_c - \dot{m}_t) \left( \frac{T_t}{m_t} \right) \quad (20)$$

Plenum Chamber $$\frac{dm_p}{dt} = \dot{m}_t - \dot{m}_{bb} \quad (21)$$

$$\frac{dT_p}{dt} = \frac{(C_p T_t \dot{m}_t - C_p T_p \dot{m}_{bb} - \dot{W} - (\dot{H} V_p^{2/3}) T_p)}{m_p C_v} - (\dot{m}_t - \dot{m}_{bb}) \left( \frac{T_p}{m_p} \right) \quad (22)$$

The chamber gas dynamics are coupled to the dynamics of the launch device via the expansion of the plenum chamber. The motion of the launch device is determined using the Newtonian equations of motion, i.e., F=ma. The true mass which must be accelerated is the sum of the device mass ($M_d$), the added mass of the fluid surrounding the device ($M_{add}$), and the ram plate and any other parasitic components ($M_{parasitic}$). The forces on the device include the pressure acting on the ram plate, frictional forces, hydrodynamic drag forces, and damping forces. Most launcher configurations can be properly modeled with a combination of these forces. For incorporation into the launcher evaluation model, the following two equations are used:

$$\ddot{x}_w = \frac{d\dot{x}_2}{dt} = \frac{(P_p - P_{amb}) A_d - F_{friction} - B\dot{x}_2 - C\dot{x}_2^2}{(M_d + M_{add} + M_{parasitic})} \quad (23)$$

$$\dot{x}_2 = \frac{dx_2}{dt} \quad (24)$$

where B is a constant for Hydrodynamic drag forces, and C is a damping force constant.

At any point during the expansion process, the plenum volume can be computed using the ram plate displacement and the plenum chamber cross-sectional area. For some launchers and launch conditions, the ram plate may separate from the device and a second set of dynamics equations must be developed. The initial set of motion equations must be adjusted to remove the device mass, the fluid added mass, and any external forces imposed directly on the vehicle.

A second set of motion equations will govern the dynamics of the vehicle after it separates from the ram plate. After separation, these dynamic equations will not influence the BAH. They will only relate the acceleration of the vehicle due to hydrodynamic and other external forces. This system complication allows the model to estimate the effects of a short power stroke and then a free-flying vehicle.

The last dynamics equation that must be included relates to the change of volume in the combustion chamber as the fuel is consumed. The rate of change of the combustion chamber volume is:

$$\frac{dV_c}{dt} = \left(\frac{ds}{dt}A(s)\right)G. \quad (25)$$

The last set of equations needed to complete the model are the ideal gas state equations for each of the system volumes. It is assumed that the mass, pressure, temperature and volume are related using the equation $$PV = mRT \quad (26)$$

Figure 4:
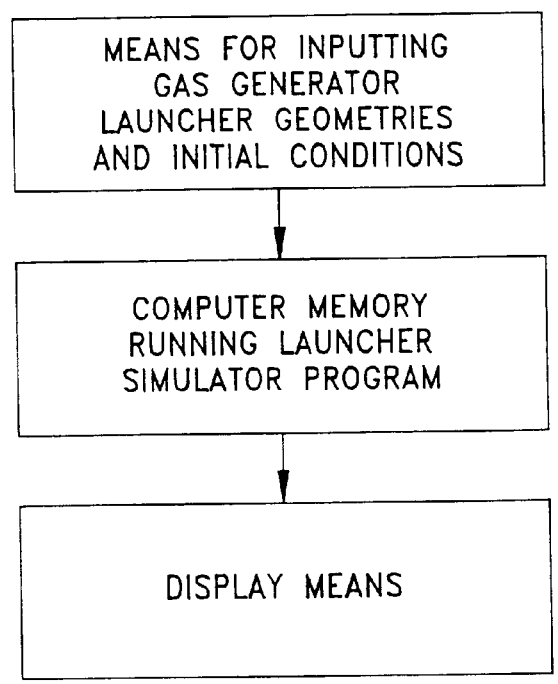
FIG. 4 is a block diagram of a computer-based gas generator launcher simulation system.

The above-derived system of equations can be solved using a computer system programmed using high level programming languages. The computer-based gas generator launcher simulation system disclosed herein is shown in FIG. 4 and includes: a means for inputting gas generator launcher geometries and initial conditions and a launcher simulator program in computer memory for resolving the above-specified gas and device dynamic equations to integrate a solution from said initial conditions to the end of a launch cycle. The system also includes a display means for displaying the integrated solution. For the present invention, a MATLAB program was developed, which makes use of second and third order Runge-Kutta formulas with variable time steps to integrate the solution from the initial conditions to the end of the launch cycle. In the MATLAB program, two BAH units are allowed, fired with prescribed time delay between them. Consequently, two sets of BAH differential equations are incorporated into the complete model.

However, before the system of equations in the preceding section can be solved, the system geometry must be fixed and the initial conditions must be established. Table 1 lists all of the initial conditions that must be established in order to effectively model a specific BAH launcher system.

EXAMPLE 1

Figure 5:
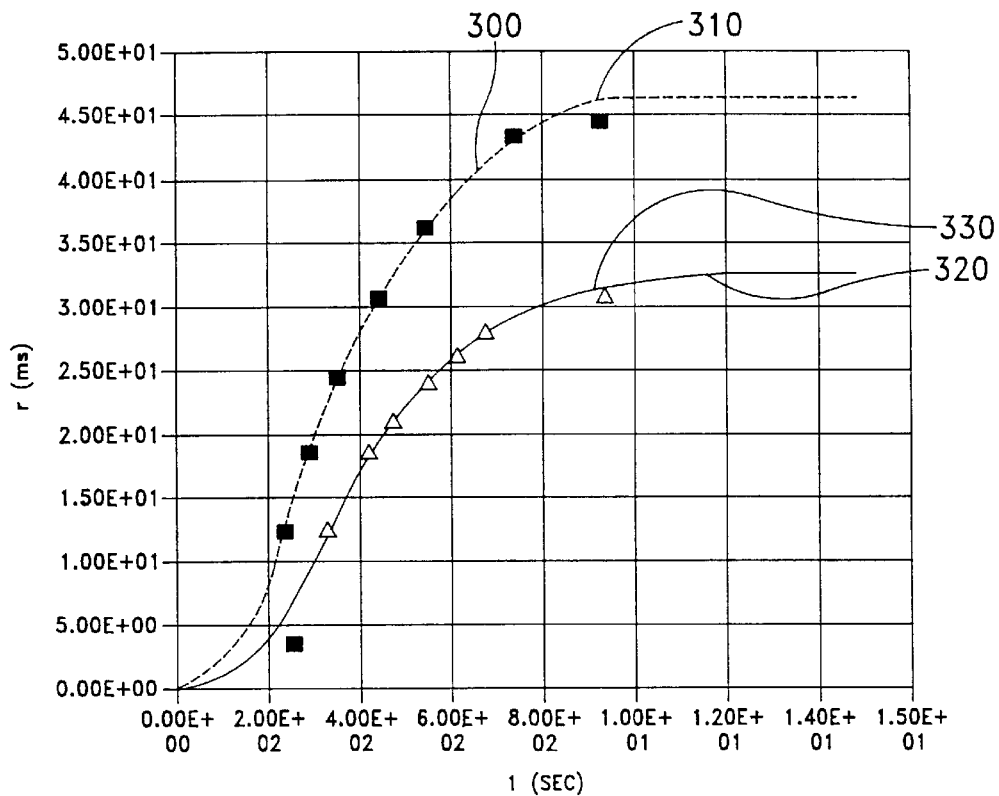
FIG. 5 is a graph of device velocities launched using one and two BAH units according to the system and method of the current invention along with actual test launcher firing data.
Figure 6:
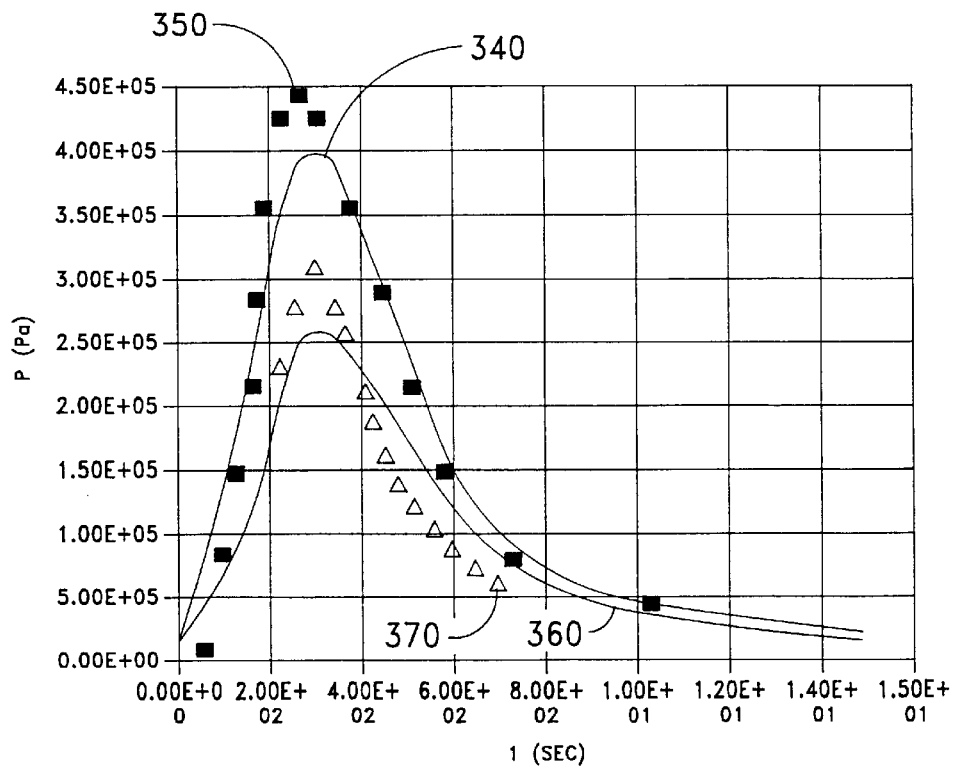
FIG. 6 is a graph of pressure behind a device launched using one and two BAH units according to the system and method of the current invention along with data obtained from actual test launcher firing.

Table 2 lists the initial conditions utilized in order to evaluate one BAH launcher system utilizing the disclosed evaluation method. Using the initial parameters of Table 2, the launch of a 73 Kg device from a 0.159 m diameter tube was simulated for one and two BAH units. An actual BAH launcher using the same initial conditions, was test fired using one and two BAH units. The results of these one and two BAH unit firing simulations are shown in FIGS. 5 and 6 along with experimental data for the same conditions. FIG. 5 shows the velocity result for one and two BAH unit firing simulations. Actual data for the two BAH unit design is indicated by square data points such as 310. The simulated data for the two BAH unit designs is indicated as line 300. Actual data for the one BAH unit design is indicated by triangular data points 330. The simulated data for the one BAH unit design is indicated as line 320. The agreement can be seen to be very good.

Some discrepancies, O(15%), however, are found in the pressures behind the device(s) as shown in FIG. 6 wherein the square data points 350 represent the actual pressure data for the two BAH unit design while the simulated data is represented by line 340, and the triangular data points 370 represent the actual pressure data for the one BAH unit design while the simulated pressure data for a one BAH unit is represented by line 360.

Additional factors can be added to the model to account for these discrepancies. The heat transfer model can be modified to account for transient effects in the system structure, the transport and thermal capacitance of solid particles variation in the orifice geometry from BAH to BAH among others. In addition, there is some uncertainty in the experimental data which has not been quantified.

Nonetheless, the disclosed evaluation methodology allows BAH launcher designers the ability to evaluate launcher designs and predict, with sufficient accuracy, the performance characteristics of their designs. Thus, unacceptable designs can be ruled out early on in the design process and only those designs for which acceptable performance characteristics can be predicted can be pursued further in the design process.

Even when all launcher initial parameters are not known explicitly, the disclosed launcher evaluation methodology can aid designers in optimizing values for the unknown parameters. For example, while launcher and device geometries will be explicitly known, certain parameters related to the BAH units themselves may not be available to designers for any number of reasons. (Of the values indicated in Table 2, parameters 27 through 36, which

TABLE 1

Initial Conditions for BAH Launcher System

| VARIABLE | DESCRIPTION |
|---|---|
| $\rho_s$ | Density of solid fuel |
| $A_d$ | Device frontal area |
| $D_p$ | Ram plate diameter |
| $M_{add}$ | Fluid added mass |
| $M_{parasitic}$ | Parasitic mass |
| $P_{po}$ | Initial plenum pressure |
| $T_{po}$ | Initial plenum temperature |
| $T_{to}$ | Initial BAH internal temperature |
| $V_t$ | BAH tank volume |
| $X_{20}$ | Initial ram plate displacement |
| $M_{po}$ | Initial mass of plenum gas |
| $M_{co}$ | Mass of gas in combustion chamber |
| $M_{to}$ | Mass of gas in tank |
| $\gamma$ | $C_p/C_v$ |
| $A_n$ | Flow loss area (launcher specific) |
| B | Device damping coefficient |
| $C_{dyn}$ | Hydrohynamic drag coefficient of device |
| $C_n$ | Flow loss coefficient (launcher specific) |
| $C_p$ | Specific heat of gas, fixed pressure |
| $C_v$ | Specific heat of gas, fixed volume |
| f | Device friction coefficient |
| $M_d$ | Device mass |
| $M_f$ | Mass of combustible fuel |
| $M_g$ | Molecular weight of gas |
| R | Gas constant |
| $V_{po}$ | Initial plenum volume |
| $\alpha$ | Burn rate exponent |
| $\beta$ | Burn rate coefficient |
| A0 | Solid fuel shape coefficient, offset |
| A1 | Solid fuel shape coefficient, slope |
| $A_c$ | Orifice area at combustion chamber exit |

TABLE 1-continued

Initial Conditions for BAH Launcher System

| VARIABLE | DESCRIPTION |
|---|---|
| $A_t$ | Orifice area at tank exit |
| $P_{to}$ | Initial BAH internal pressures |
| T | Enthalpy of combustion/Cp |
| H | Internal heat transfer coefficient |
| $V_c$ | Combustion chamber volume |

TABLE 2

Simulation Parameters for BAH Launcher System of Example 1

Figure 7:
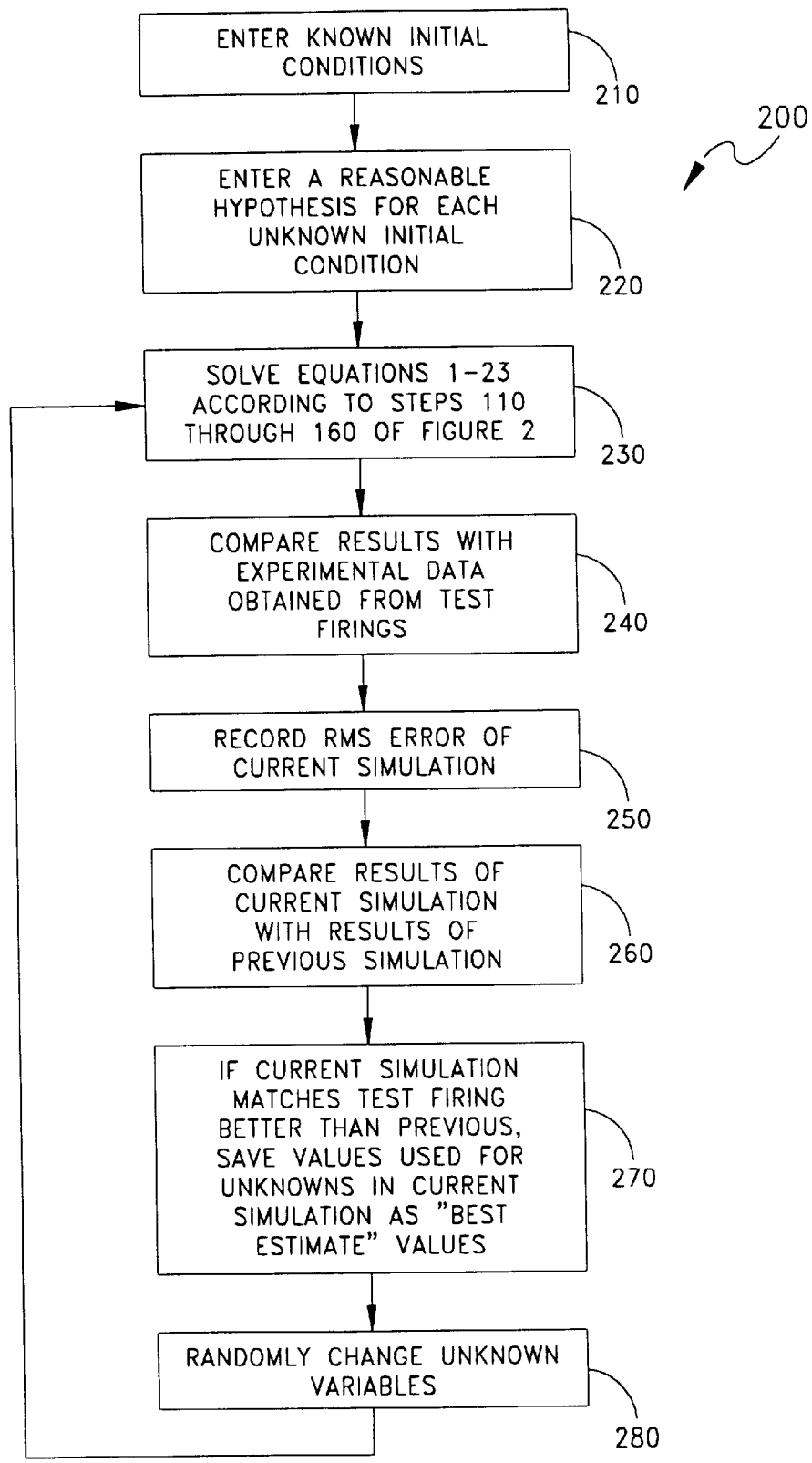
FIG. 7 is a flow chart of an optimization process, which is used to ascertain values for unknown initial conditions.

| No. | VARIABLE | DESCRIPTION | VALUE |
|---|---|---|---|
| 1 | $\rho_s$ | Density of solid fuel | 1681 kg/m³ |
| 2 | $A_d$ | Device frontal area | 1.986e-2 m² |
| 3 | $D_p$ | Ram plate diameter | 0.159 m |
| 4 | $M_{add}$ | Fluid added mass | 0 kg |
| 5 | $M_{parasitic}$ | Parasitic mass | 0 kg |
| 6 | $P_{po}$ | Initial plenum pressure | 1.013e5 Pa |
| 7 | $T_{po}$ | Initial plenum temperature | 273.2 K. |
| 8 | $T_{to}$ | Initial BAH internal temperature | 273.2 K. |
| 9 | $V_t$ | BAH tank volume | 4.81e-4 m³ |
| 10 | $X_{2o}$ | Initial ram plate displacement | 0 |
| 11 | $M_{po}$ | Initial mass of plenum gas | Eqn 26 |
| 12 | $M_{co}$ | Mass of gas in combustion chamber | Eqn 26 |
| 13 | $m_{to}$ | Mass of gas in tank | Eqn 26 |
| 14 | $\gamma$ | $C_p/C_v$ | 1.561 |
| 15 | $A_n$ | Flow loss area | 0 |
| 16 | B | Device damping coefficient | 0 |
| 17 | $C_{dyn}$ | Hydrohynamic drag coeff. of device | 0 |
| 18 | $C_n$ | Flow loss coefficient | 0 |
| 19 | $C_p$ | Specific heat of gas, fixed press. | 487.3 J/kg/k |
| 20 | $C_v$ | Specific heat of gas, fixed vol. | 312.2 J/kg/K |
| 21 | f | Device friction coefficient | 0 |
| 22 | $M_d$ | Device mass | 73 kg |
| 23 | $M_f$ | Mass of combustible fuel | 0.026 kg |
| 24 | $M_g$ | Molecular weight of gas | 39.24 kg/kmole |
| 25 | R | Gas constant | 211.9 J/kg/K |
| 26 | $V_{po}$ | Initial plenum volume | 0.0227 m³ |
| 27 | $\alpha$ | Burn rate exponent | 0.2577 |
| 28 | $\beta$ | Burn rate coefficient | 0.5224 |
| 29 | A0 | Solid fuel shape coeff., offset | 0.29 m² |
| 30 | A1 | Solid fuel shape coeff., slope | 1.664 m |
| 31 | $A_c$ | Orifice area: combustion chamber exit | 2.14e-5 m² |
| 32 | $A_t$ | Orifice area: tank exit | 7.00e-5 m² |
| 33 | $P_{to}$ | Initial BAH internal pressures | 2.55e7 Pa |
| 34 | T | Enthalpy of combustion/Cp | 3443 K |
| 35 | H | Internal heat transfer coefficient | 846.7 W/K/m² |
| 36 | $V_c$ | Combustion chamber volume | 1.37e-4 m³ | relate specifically to the BAH unit(s) themselves, were initially unknown.) To determine these values, a simplified model was developed for the discharge of a BAH into a tank by adjusting the known launch system parameters as necessary and an optimization process, as shown in FIG. 7, was performed to determine the "best estimates" for the unknown variables. The optimization process 200 begins with entering known initial conditions, step 210 and entering reasonable hypotheses for the unknown variables, step 220. Equations 1 through 23 are then solved using the MATLAB program, step 230. Upon completion of the simulation, the results are compared to experimental data obtained from test firings of a BAH unit in a similar configuration, step 240. The root mean squared (RMS) error of the simulation is then recorded, step 250. The results of the current simulation are compared to the results of previous simulations, step 260. If the variables used in the most current simulation produce a result that more accurately matches the experimental data than the preceding simulation, then the new variables are recorded as the current "best estimate", step 270. The unknown variables are then randomly changed, step 280.

The simulation is then repeated with the new variables and the accuracy of the simulation is compared to the preceding simulation. This process is then repeated a large number of times until the solution converges at a point of minimum error. Although this "random walk" optimization process is functional, its accuracy depends, in large part, on the range of variables allowed and the number of times the equations are solved using the different variables. Nonetheless, once the unknown parameters are optimized, their "best estimate" values can be utilized in the disclosed evaluation methodology for any number of additional launcher configurations that use substantially the same BAH units.

Figure 8:
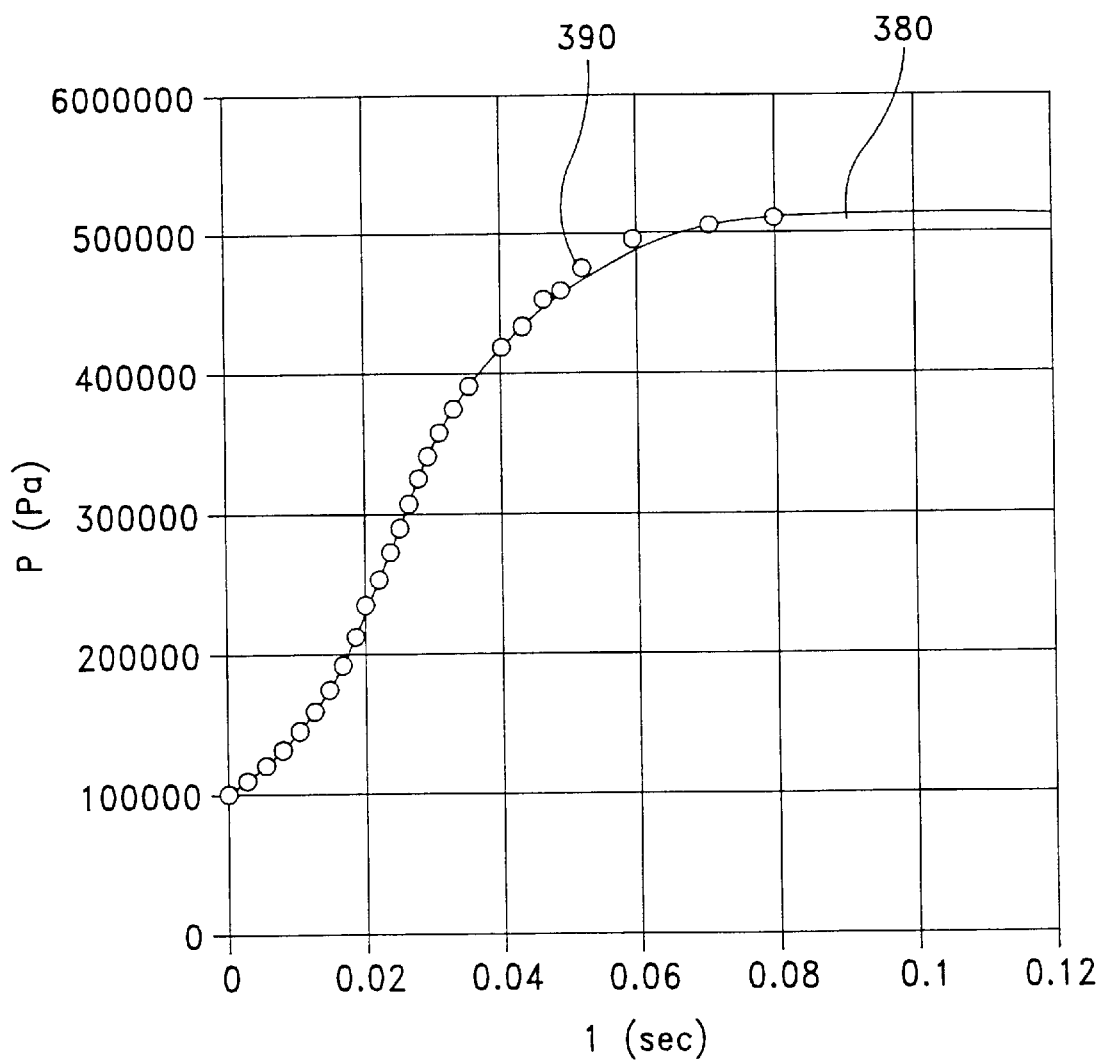
FIG. 8 is a graph of the results of BAH firings into a 100 liter tank, showing results derived through the modeling system and method of the present invention along with experimental values obtained from an actual test launcher firing.

FIG. 8 plots a comparison of the simulated BAH firing using the disclosed evaluation methodology, curve 380, and experimental data, points 390 recorded during an actual BAH launch cycle. The pressures in a 100 liter tank are shown versus time. As can be seen, the disclosed evaluation methodology predicts the actual data extremely well (error of the order of 1%). The experimental data has been extrapolated in time to improve the prediction accuracy near the end of the combustion simulation.

In light of the above, it is therefore understood that within the scope of the appended claims, the invention may be practiced otherwise than as specifically described.

What is claimed is:

1. A method for evaluating a gas generator launcher system including at least one gas generator having a gas generant fuel housed within a combustion chamber, a gas expansion tank containing a compressed gas communicating with said combustion chamber through an internal orifice, a plenum communicating with said compressed gas tank through an external orifice, said plenum including a device to be launched, said method comprising the steps of:

fixing the system geometry and establishing initial conditions of said launcher system including, characteristics of said gas generant fuel, geometries of said tank, internal and external orifices and plenum chamber, an initial pressure within said tank and characteristics of said device to be launched including a gap existing between said device and walls of said plenum;

modeling a gas generant fuel burn rate and calculating an amount of mass and energy added to the combustion chamber as the fuel generates gas;

calculating a rate of mass flux out of said combustion chamber and into said gas expansion tank utilizing said internal orifice geometry, tank and combustion chamber temperatures, tank mass, and a ratio of combustion chamber and tank pressure;

calculating a rate of energy flux out of said combustion chamber and into said expansion tank utilizing the rate of mass flux out of said combustion chamber and into said tank, the combustion chamber temperature and the specific heat of the generated gas;

calculating a rate of mass flux out of said tank and into said plenum using external orifice geometry, tank and plenum temperatures, plenum mass and a ratio of tank and plenum pressures;

calculating a rate of energy flux out of said tank and into said plenum using the rate of mass flux out of said tank and into said plenum, the tank temperature and the specific heat of the tank gas; and modeling the launch of the device within the plenum using characteristics of the device, the mass and energy input into the plenum and subtracting losses resulting from blow-by through the gap between the device and the plenum walls.

2. The method claimed in claim 1 wherein said system further includes a ram plate in said plenum intermediate said external orifice and said device and wherein said losses resulting from blow-by through said gap between the ram plate and the plenum walls are negligible.

3. The method of claim 1 wherein said blow-by losses are calculated by computing the mass flow rate of gasses flowing through said gap.

4. The method of claim 3 wherein said mass flow rate through said gap is modeled as Fanno flow.

5. The method of claim 1 wherein all gas in the system is modeled as an ideal gas.

6. The method of claim 5 wherein said fuel is assumed to remain at ambient temperature until it is burned.

7. The method of claim 6 wherein flow through said internal and external orifices is assumed to be adiabatic and compressible.

8. The method of claim 1 further comprising the steps of:

entering a reasonable hypothesis for the value of each unknown initial condition;

performing at least one test firing of a simple launcher incorporating unknown conditions;

simulating a launch using the current initial conditions;

comparing results of simulation with experimental data obtained from said test firing;

recording root mean square error of a current simulation;

comparing results of current simulation with results of a previous simulation if any;

saving current values of unknown variables as best estimate values if results of current simulation match experimental data better than said previous estimate;

randomly changing the values of unknown variables; and repeating the steps of simulating, comparing with experimental data, recording root mean square error, comparing simulation results and saving best estimate values.

9. A computer-based gas generator launcher simulation system comprising:

a means for inputting gas generator launcher geometries and initial conditions;

a launcher simulator program in computer memory for resolving gas and device dynamic equations to integrate a solution from said initial conditions to the end of a launch cycle; and a display means for displaying the integrated solution.

10. The computer-based gas generator launcher simulation system as claimed in claim 9 wherein said launcher simulator program comprises second and third order Runge-Kutta differential equation solution with variable time steps to integrate the solution.

* * * * *